(12) United States Patent
Matsushima

(10) Patent No.: US 12,393,080 B2
(45) Date of Patent: Aug. 19, 2025

(54) IMAGE OUTPUT PANEL AND HEAD-UP DISPLAY

(71) Applicant: Japan Display Inc., Tokyo (JP)

(72) Inventor: Toshiharu Matsushima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 397 days.

(21) Appl. No.: 18/185,411

(22) Filed: Mar. 17, 2023

(65) Prior Publication Data

US 2023/0305339 A1 Sep. 28, 2023

(30) Foreign Application Priority Data

Mar. 23, 2022 (JP) ................................. 2022-047076

(51) Int. Cl.
G02F 1/13363 (2006.01)
G02B 27/01 (2006.01)
G02F 1/1335 (2006.01)

(52) U.S. Cl.
CPC ... *G02F 1/133638* (2021.01); *G02B 27/0101* (2013.01); *G02F 1/133528* (2013.01); *G02B 2027/0118* (2013.01)

(58) Field of Classification Search
CPC ......... G02F 1/133638; G02F 1/133528; G02B 27/0101; G02B 2027/0118

USPC .......................................................... 359/630
See application file for complete search history.

(56) References Cited

U.S. PATENT DOCUMENTS 9,638,918 B2   5/2017 Uehara

FOREIGN PATENT DOCUMENTS

JP   2010066437 A   *   3/2010
JP   2014-123076 A   7/2014

* cited by examiner

*Primary Examiner* — William Choi
(74) *Attorney, Agent, or Firm* — XSENSUS LLP

(57) ABSTRACT

An image output panel includes: a first polarization plate that transmits light polarized in a first direction and blocks light polarized in a direction different from the first direction; a second polarization plate that transmits light polarized in a second direction different from the first direction and blocks light polarized in a direction different from the second direction; a liquid crystal panel that is disposed between the first polarization plate and the second polarization plate; and a retardation plate that changes the polarization direction of light from the first direction to the second direction or from the second direction to the first direction. When a polarization direction of output light that is output from the image output panel is referred to as a first polarization direction, the output light having the first polarization direction is light having the first polarization direction included in incident light from a light source.

8 Claims, 8 Drawing Sheets

ISOLUMINANCE CONTOUR [nt]

ISOLUMINANCE CONTOUR [nt]

IMAGE OUTPUT PANEL AND HEAD-UP DISPLAY

CROSS-REFERENCE TO RELATED APPLICATION

This application claims the benefit of priority from Japanese Patent Application No. 2022-047076 filed on Mar. 23, 2022, the entire contents of which are incorporated herein by reference.

BACKGROUND

1. Technical Field

The present disclosure relates to an image output panel and a head-up display.

2. Description of the Related Art

Head-up displays have been known that utilize an image output panel including two polarization plates with different polarization directions of transmitted light and a transmissive liquid crystal panel sandwiched between the two polarization plates.

In an example of the head-up displays, the image output panel may be inclined with respect to a light emission surface of a light source. In this case, one surface facing the light emission surface of the image output panel may function as a light refraction interface and reflect some of light. A p-wave tends to have a lower reflectance at the interface than an s-wave. Thus, a technical tendency exists that a polarization plate that transmits the p-wave is provided on the one surface side of the image output panel.

Generally, in a plurality of pixels provided in a liquid crystal panel, a degree of polarization of light in the light polarization direction is individually controlled to output images corresponding to input image data. Thus, another polarization plate that transmits light (e.g., the s-wave) having a polarization direction different from that of the p-wave is inevitably provided on the other surface side of the image output panel.

A user who views images projected by the head-up display may not always view the images with the naked eyes, but may also view the images while wearing polarized sunglasses. For example, a light absorption axis of the polarized sunglasses tends to correspond to the direction of arrangement of the user's two eyes. The coincidence of the light absorption axis with the polarization direction of the s-wave described above sometimes makes it difficult for users wearing polarized sunglasses to view images. On the other hand, when the polarization direction of projected light is different from the polarization direction of the s-wave, it is difficult to utilize the p-wave in light entering the liquid crystal panel. As a result, brightness of images is reduced.

For the foregoing reasons, there is a need for an image output panel and a head-up display that can achieve both projection of a brighter image and viewing of the image by a user wearing polarized sunglasses.

SUMMARY

According to an aspect of the present disclosure, an image output panel includes: a first polarization plate that transmits light polarized in a first direction and blocks light polarized in a direction different from the first direction; a second polarization plate that transmits light polarized in a second direction different from the first direction and blocks light polarized in a direction different from the second direction; a liquid crystal panel that is disposed between the first polarization plate and the second polarization plate and includes a plurality of pixels in which a degree of change in a polarization direction of light entering from one side and travelling toward the other side is individually controllable; and a retardation plate that faces the liquid crystal panel with the first polarization plate or the second polarization plate that is interposed between the retardation plate and the liquid crystal panel, and changes the polarization direction of light from the first direction to the second direction or from the second direction to the first direction. When a polarization direction of output light that is output from the image output panel is referred to as a first polarization direction, the output light having the first polarization direction is light having the first polarization direction included in incident light from a light source.

According to another aspect of the present disclosure, a head-up display includes: a light source that is configured to emit light from a light emission surface; and an image output panel that is provided so as to be inclined with respect to the light emission surface at an angle. The head-up display is configured to project light that is emitted from the light emission surface and transmitted through the image output panel onto a projection destination member having a light-transmitting property. The image output panel includes: a first polarization plate that transmits a p-wave when a plate surface on the light emission surface side of the image output panel is regarded as an interface, and blocks light polarized in a direction different from that of the p-wave; a second polarization plate that transmits an s-wave when the plate surface is regarded as the interface, and blocks light polarized in a direction different from that of the s-wave; a liquid crystal panel that is disposed between the first polarization plate and the second polarization plate and includes a plurality of pixels in which a degree of change in a polarization direction of light entering from the light emission surface side and travelling toward the opposite side opposite to the light emission surface side is individually controllable; and a retardation plate that changes the polarization direction of light entering from the light emission surface side and travelling toward the opposite side from the polarization direction of the p-wave to the polarization direction of the s-wave or from the polarization direction of the s-wave to the polarization direction of the p-wave. Each of the light that enters the liquid crystal panel from the light emission surface side and the light that is transmitted through the image output panel is light transmitted through the plate surface as the p-wave.

DETAILED DESCRIPTION

Figure 1:
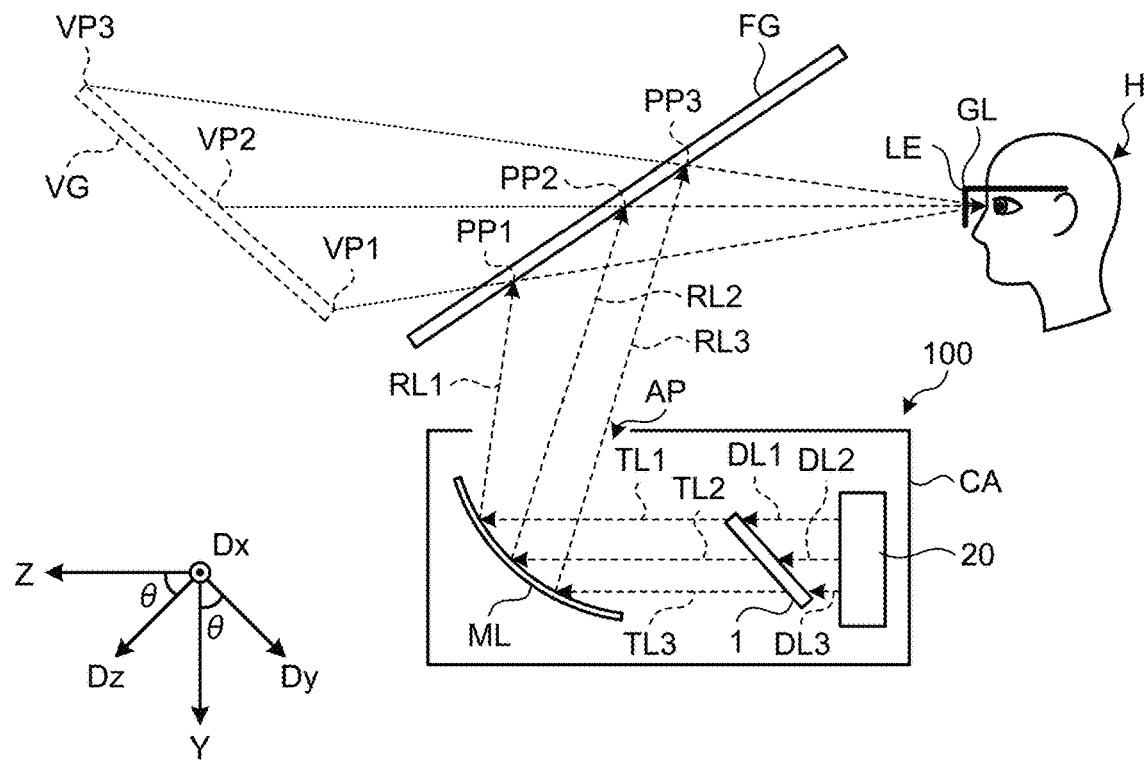
FIG. 1 is a schematic diagram illustrating an exemplary main configuration of a head-up display (HUD) and the operation of the HUD relating to viewing of a virtual image by a user.

Hereinafter, an embodiment of the present disclosure will be described with reference to the drawings. What is disclosed herein is merely an example, and it is needless to say that appropriate modifications within the gist of the invention at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has already been referred to, and detail explanation thereof can be appropriately omitted.

FIG. 1 is a schematic diagram illustrating an exemplary main configuration of a HUD 100 and the operation of the HUD 100 relating to viewing of a virtual image VG by a user H. The HUD 100 includes an image output panel 1 and a light source 20. The image output panel 1 includes a liquid crystal panel 10 that outputs an image to be projected onto a projection destination member (e.g., a windshield FG) onto which the image is projected by the HUD 100 (refer to FIG. 3). The light source 20 emits light to the image output panel 1. Of the light emitted from the light source 20, light transmitted through the image output panel 1 is projected onto the projection destination member described above.

The light source 20 has a light emission surface 20a (refer to FIG. 3) that is orthogonal to an optical axis of light travelling toward the image output panel 1 from the light source 20. Hereinafter, it is assumed that the direction along the optical axis is a Z direction. It is assumed that one of the two directions along the light emission surface 20a is referred to as a Y direction, and the other is referred to as a Dx direction. FIG. 1 exemplarily illustrates light DL1, DL2, and DL3 as the light travelling toward the image output panel 1 from the light emission surface 20a. Of the light DL1, light transmitted through the image output panel 1 is illustrated as light TL1. Of the light DL2, light transmitted through the image output panel 1 is illustrated as light TL2. Of the light DL3, light transmitted through the image output panel 1 is illustrated as light TL3.

Specifically, the light source 20 is a light source device provided with a plurality of light emitting elements along the light emission surface 20a. The light emitting element is a light emitting diode (LED), for example. The light emitting element is not limited to the LED and may be other light emitting element having a structure functioning in the same manner, such as a light emitting element using an organic electroluminescence (EL).

The plate surface of the image output panel 1 is inclined with respect to the light emission surface 20a of the light source 20. Assuming that one of the two directions along the plate surface of the image output panel 1 is the Dx direction, a Dy direction, which is the other of the two directions, makes a polar angle θ with respect to the Y direction. It is assumed that the direction orthogonal to the Dx and the Dy directions is a Dz direction. The angle made between the Dz and the Z directions is also the polar angle θ. The polar angle θ is an acute angle. The Dz direction is the normal of the plate surface of the image output panel 1. The polar angle θ made between the Z direction along the optical axis extending from the light source 20 and the Dz direction corresponds to a light incident angle when the plate surface of the image output panel 1 is regarded as an interface.

The HUD 100 illustrated in FIG. 1 further includes a reflection member ML and a housing CA. The reflection member ML reflects light that is emitted from the light source 20 and transmitted through the image output panel 1, and directs the light to the windshield FG. The housing CA covers the surroundings of the image output panel 1, the light source 20, and the reflection member ML. The housing CA is provided with an aperture AP so as not to close a light path between the reflection member ML and the windshield FG. FIG. 1 illustrates, as light RL1, RL2, and RL3, light that is reflected by the reflection member ML and directed to the windshield FG through the aperture AP. The light RL1 is the light TL1 that is reflected by the reflection member ML and projected to a projection point PP1 on the windshield FG. The light RL2 is the light TL2 that is reflected by the reflection member ML and projected to a projection point PP2 on the windshield FG. The light RL3 is the light TL3 that is reflected by the reflection member ML and projected to a projection point PP3 on the windshield FG.

The windshield FG is a member having a light-transmitting property. To take a specific example, the windshield FG is a windshield of a four-wheeled vehicle. The projection destination member onto which images are projected by the HUD 100 is not limited to the windshield FG, but may be a resin having a light-transmitting property. The projection destination member may be a light-transmitting member having a flat shape or a light-transmitting member having a curvature.

The image projected onto the windshield FG from the HUD 100 is recognized by the user H as the virtual image VG. In the example illustrated in FIG. 1, the color and brightness of light at a virtual image point VP1 of the virtual image VG correspond to the color and brightness of light projected onto the projection point PP1. The color and brightness of light at a virtual image point VP2 of the virtual image VG correspond to the color and brightness of light projected onto the projection point PP2. The color and brightness of light at a virtual image point VP3 of the virtual image VG correspond to the color and brightness of light projected onto the projection point PP3.

The positional relations between the virtual image points VP1, VP2, and VP3 that are recognized by the user H, especially the positional relation in the Z direction therebetween, correspond to the optical path length of each of the lights TL1, TL2, and TL3 and the optical path length of each of the lights RL1, RL2, and RL3.

Specifically, a distance (z1) between the user H's viewpoint and the virtual image point VP1 is represented by the following equation (1), where t1 is the value indicating the optical path length of the light TL1, and r1 is the value indicating the optical path length of the light RL1. Ex in equation (1), and equations (2) and (3), which are described later, indicates a magnification factor of image magnification caused by the optical path length between the reflection member ML, which is a concave mirror, and the windshield FG, which is the projection target.

$$z1 = r1 + t1 \times Ex \quad (1)$$

A distance (z2) between the user H's viewpoint and the virtual image point VP2 is represented by the following equation (2), where t2 is the value indicating the optical path length of the light TL2, and r2 is the value indicating the optical path length of the light RL2.

$$z2 = r2 + t2 \times Ex \quad (2)$$

A distance (z3) between the user H's viewpoint and the virtual image point VP3 is represented by the following equation (3), where t3 is the value indicating the optical path length of the light TL3, and r3 is the value indicating the optical path length of the light RL3.

$$z3 = r3 + t3 \times Ex \quad (3)$$

Figure 3:
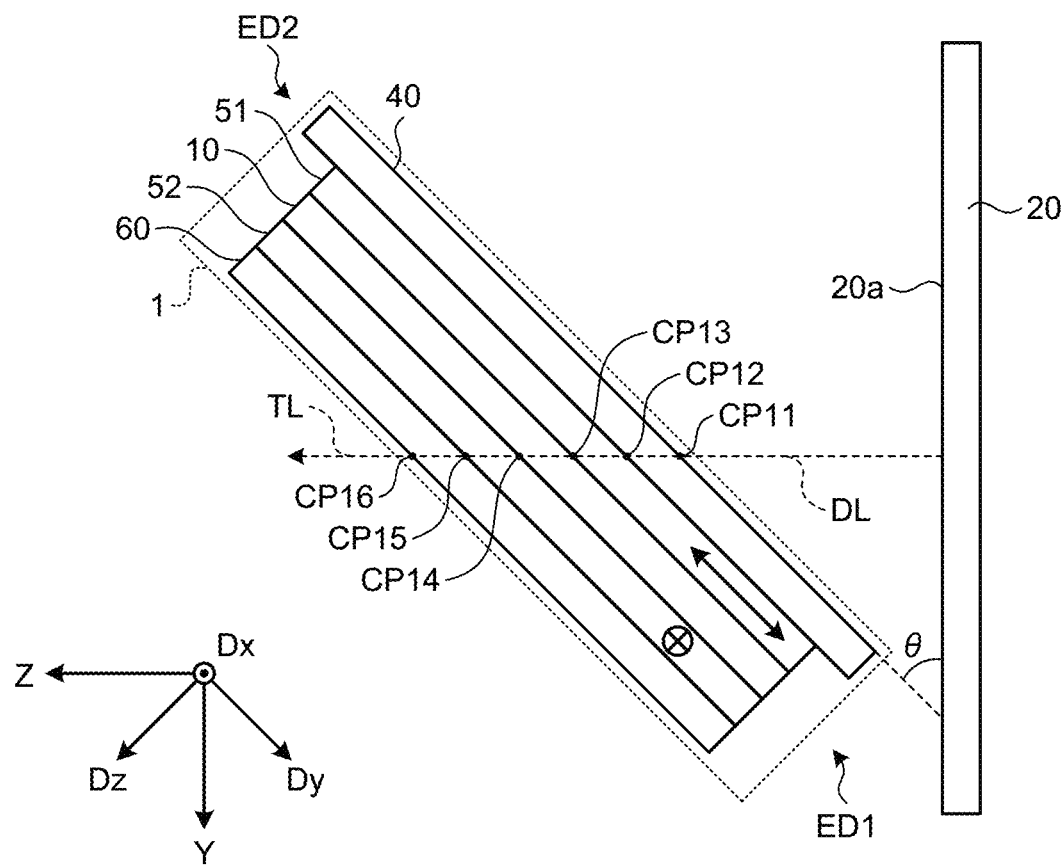
FIG. 3 is a schematic view illustrating an exemplary structure of an image output panel.

As an example of a projection of the virtual image VG when the user H is assumed to view the virtual image VG projected onto the windshield FG provided on a four-wheeled vehicle, the virtual image VG may be projected that is viewed as if it were along the road surface on which the four-wheeled vehicle runs. In order to achieve such projection of the virtual image VG, z3 needs to be significantly larger than z1 and z2, and z2 needs to be significantly larger than z1. In order to establish such relation between z1, z2, and z3, the plate surface of the image output panel 1 may be inclined with respect to the light emission surface 20a of the light source 20 such that the polar angle θ illustrated in FIG. 3 is made. In the embodiment, θ is 45 degrees (°), for example, but it is not limited to this example. The polar angle θ can be changed as appropriate. The polar angle θ may be a Brewster's angle, which is described later, for example. The Brewster's angle may be 45 degrees (°). In addition to the achievement of the virtual image VG, making the polar angle θ allows the virtual image VG to be viewed as a brighter image. The details of the relation between the polar angle θ and brightness will be described later.

In some cases, the user H viewing the image projected by the HUD 100 may wear polarized sunglasses GL. When the user H wears polarized sunglasses GL, an optical member LE of the polarized sunglasses GL is interposed on the light projection line between the windshield FG and the user H.

Figure 2:
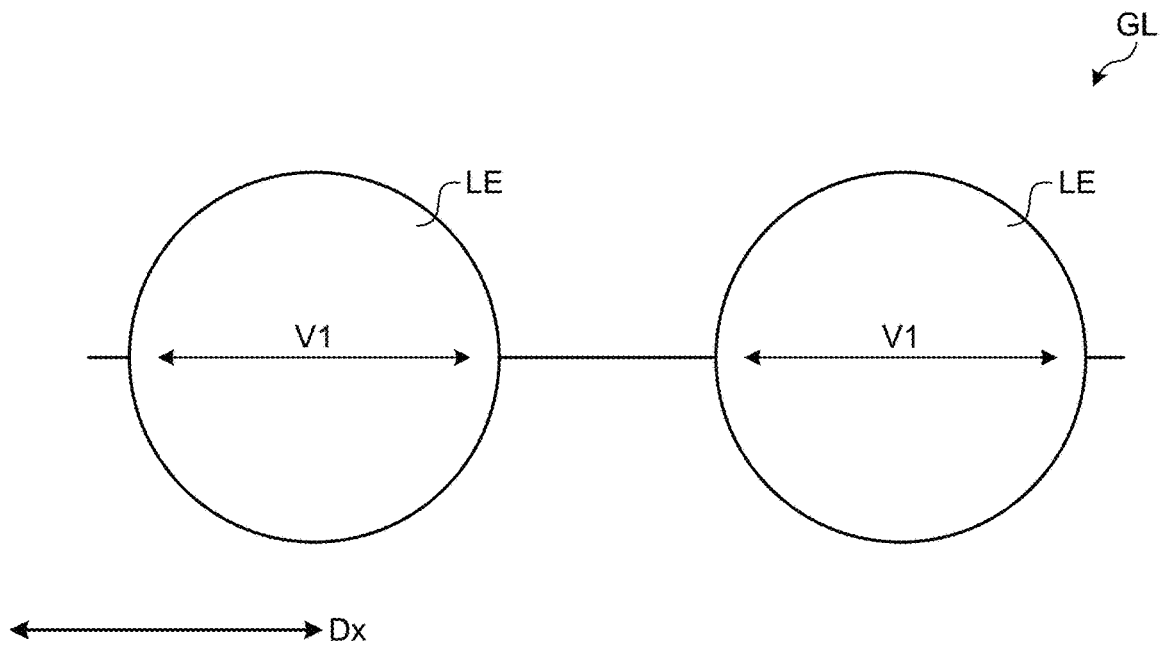
FIG. 2 is a schematic diagram illustrating an absorption axis of light absorbed by an optical member of polarized sunglasses.

FIG. 2 is a schematic diagram illustrating an absorption axis V1 of light absorbed by the optical member LE of the polarized sunglasses GL. As illustrated in FIG. 2, the optical member LE absorbs light polarized along the absorption axis V1 along the Dx direction. The optical member LE transmits light polarized in a direction other than the direction of the absorption axis V1.

The HUD 100 of the embodiment projects, onto the windshield FG, an image allowing the user H to recognize the virtual image VG even when the user H wears the polarized sunglasses GL. Specifically, the HUD 100 of the embodiment projects, onto the windshield FG, light polarized in a direction different from the direction of the absorption axis V1, i.e., different from the Dx direction. In order to achieve such projection, the HUD 100 of the embodiment is designed such that the polarization direction of light transmitted through the image output panel 1 (e.g., the light TL1, TL2, TL3 illustrated in FIG. 1) is different from the Dx direction. The polarization direction refers to the polarization direction of light that is polarized in a specific direction. When referring to polarized light or polarization light, it refers to light, being electromagnetic waves, in which the oscillation direction of the electromagnetic field is regulated (i.e., polarized in a specific direction).

FIG. 3 is a schematic view illustrating an exemplary structure of the image output panel 1. The image output panel 1 includes a diffusion plate 40, a first polarization plate 51, the liquid crystal panel 10, a second polarization plate 52, and a retardation plate 60. The diffusion plate 40, the first polarization plate 51, the liquid crystal panel 10, the second polarization plate 52, and the retardation plate 60 are arranged in this order from a light source 20 side to a reflection member ML side (refer to FIG. 1). The diffusion plate 40, the first polarization plate 51, the liquid crystal panel 10, the second polarization plate 52, and the retardation plate 60 are stacked in the Dz direction. The diffusion plate 40, the first polarization plate 51, the liquid crystal panel 10, the second polarization plate 52, and the retardation plate 60 each have a plate like shape or film like shape along a plane (Dx-Dy plane) orthogonal to the Dz direction.

FIG. 3 illustrates the light that is emitted from the light source 20 and travels toward the image output panel 1 as light DL. Of the light DL, light that is transmitted through the image output panel 1 and travels toward the reflection member ML (refer to FIG. 1) is illustrated as light TL. A position CP11 is a position where the light DL starts to enter the diffusion plate 40. A position CP12 is a position between the diffusion plate 40 and the first polarization plate 51. A position CP13 is a position between the first polarization plate 51 and the liquid crystal panel 10. A position CP14 is a position between the liquid crystal panel 10 and the second polarization plate 52. A position CP15 is a position between the second polarization plate 52 and the retardation plate 60. A position CP16 is a position where the light TL starts to be emitted from the retardation plate 60.

Figure 8:
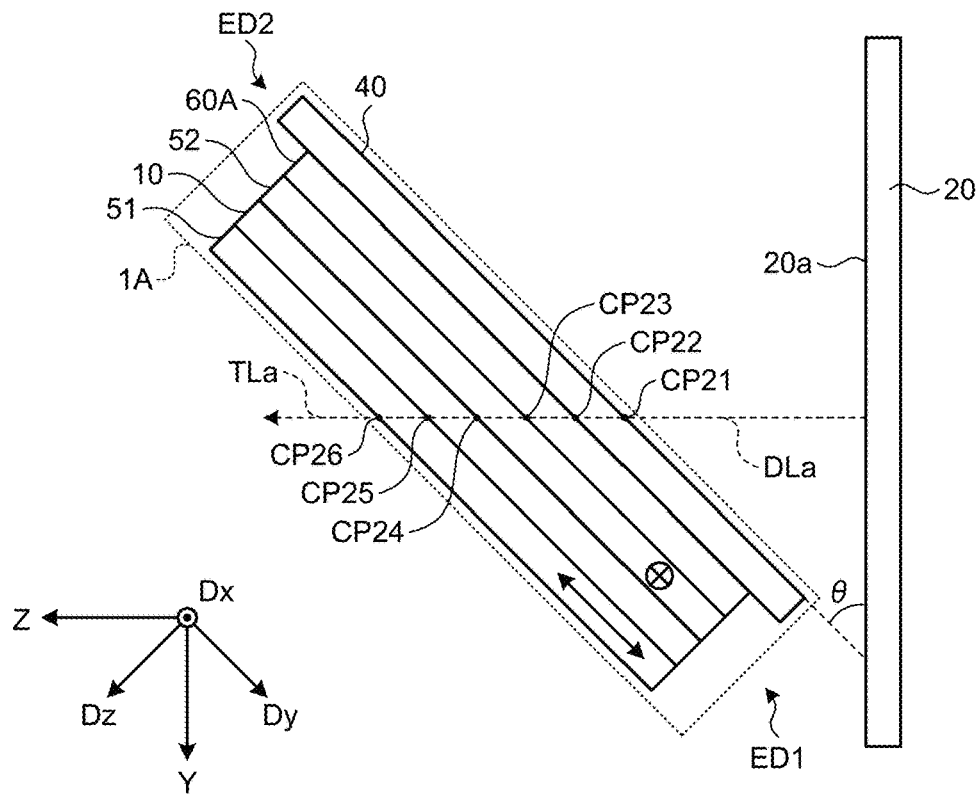
FIG. 8 is a schematic diagram illustrating an exemplary structure of an image output panel that can be provided instead of the image output panel of FIG. 3 in an embodiment.
Figure 9:
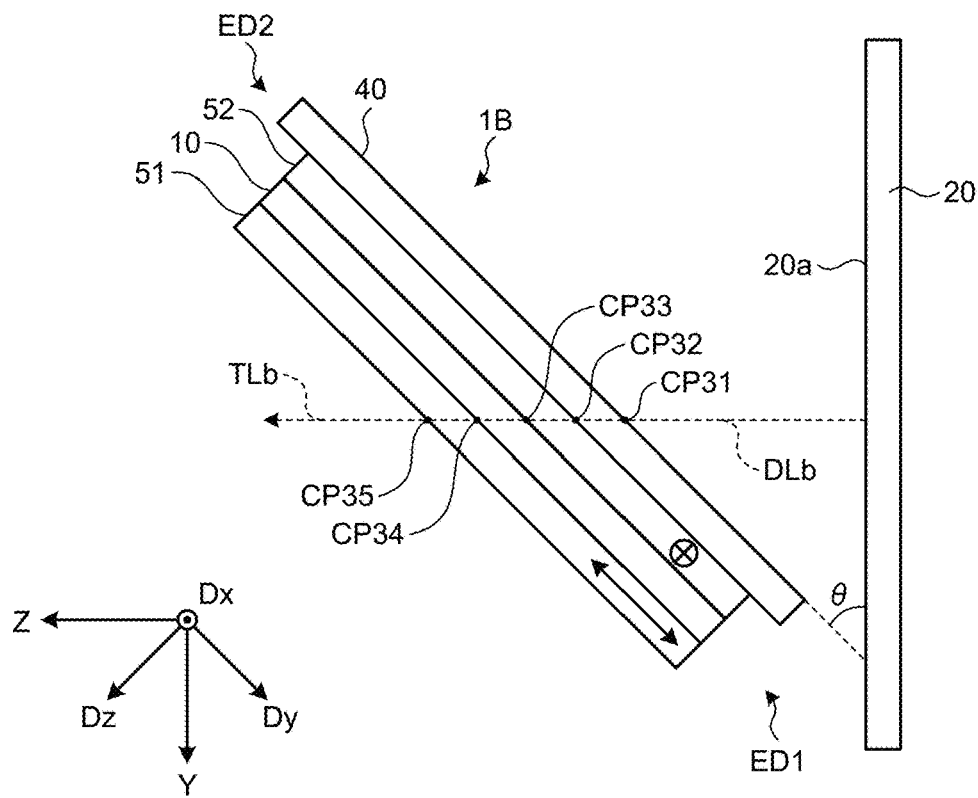
FIG. 9 is a schematic diagram illustrating a structure of a reference example.

In FIG. 3, the positions CP11, CP12, CP13, CP14, CP15, CP16 and the light TL are located on the extended straight line of the optical axis of the light DL. Those are, however, not actually located on the extended straight line of the light DL. Strictly speaking, due to the refraction of light according to a refractive index difference between the image output panel 1 and the component of the space (e.g., air) surrounding the image output panel 1, the positions CP11, CP12, CP13, CP14, CP15, and CP16 are located in accordance with a degree of change in a light travelling direction (refraction angle) due to such refraction. In FIG. 3, and FIGS. 8 and 9, which are described later, the exact illustration of the change in a light travelling direction due to such refraction of light is omitted, for the sake of clarity.

The light DL in the embodiment is unpolarized light. In other words, the light DL, which is electromagnetic waves, has no noteworthy regularity in the oscillation direction of the electric and magnetic fields. Thus, at the position CP11, light emitted from the light source 20 is unpolarized light.

The diffusion plate 40 is an optical member that transmits light incident from one surface thereof while diffusing the light toward the other surface thereof. Light after being transmitted through the diffusion plate 40 is more uniformly diffused than before being transmitted. Light that is emitted from the light source 20 and reaches the position CP12 is more uniformly diffused on the first polarization plate 51 side than light at the position CP11.

The first polarization plate 51 is an optical member that transmits a p-wave and blocks light having a polarization direction other than the polarization direction of the p-wave. In other words, when the surface on the diffusion plate 40 side of the first polarization plate 51 is regarded as the interface, the first polarization plate 51 transmits light having a polarization direction parallel to an incident plane of the interface and blocks light having a polarization direction that is not parallel to the incident plane. The incident plane is the plane perpendicular to the interface and includes an incident direction of light and a reflection direction of the light. The surface on the diffusion plate 40 side of the first polarization plate 51 is along a plane (Dx-Dy plane) orthogonal to the Dz direction. Hereinafter, in a case where simply referring to the p-wave, it refers to light that is parallel to the incident plane when the plane (Dx-Dy plane) orthogonal to the Dz direction is regarded as the interface. The light that is emitted from the light source 20 and reaches the position CP13 is thus the p-wave. The incident plane is the plane (Y-Z plane) orthogonal to the Dx direction. The polarization direction of the p-wave is not along the Dx direction. The polarization direction of the p-wave is along the Y-direction within the region of the light DL. In FIG. 3 and other figures, the first polarization plate 51 is marked with the double pointed arrow along the Dy direction for the purpose of indicating that the first polarization plate 51 transmits the p-wave. As described above, the first polarization plate 51 is a linear polarization plate having a transmission axis in the Dy direction.

The liquid crystal panel 10 has a plurality of pixels Pix in which a degree of transmission of light entering therein from the position CP13 to the position CP14 can be individually controlled. The following explains the liquid crystal panel 10 with reference to FIGS. 4 to 6.

Figure 4:
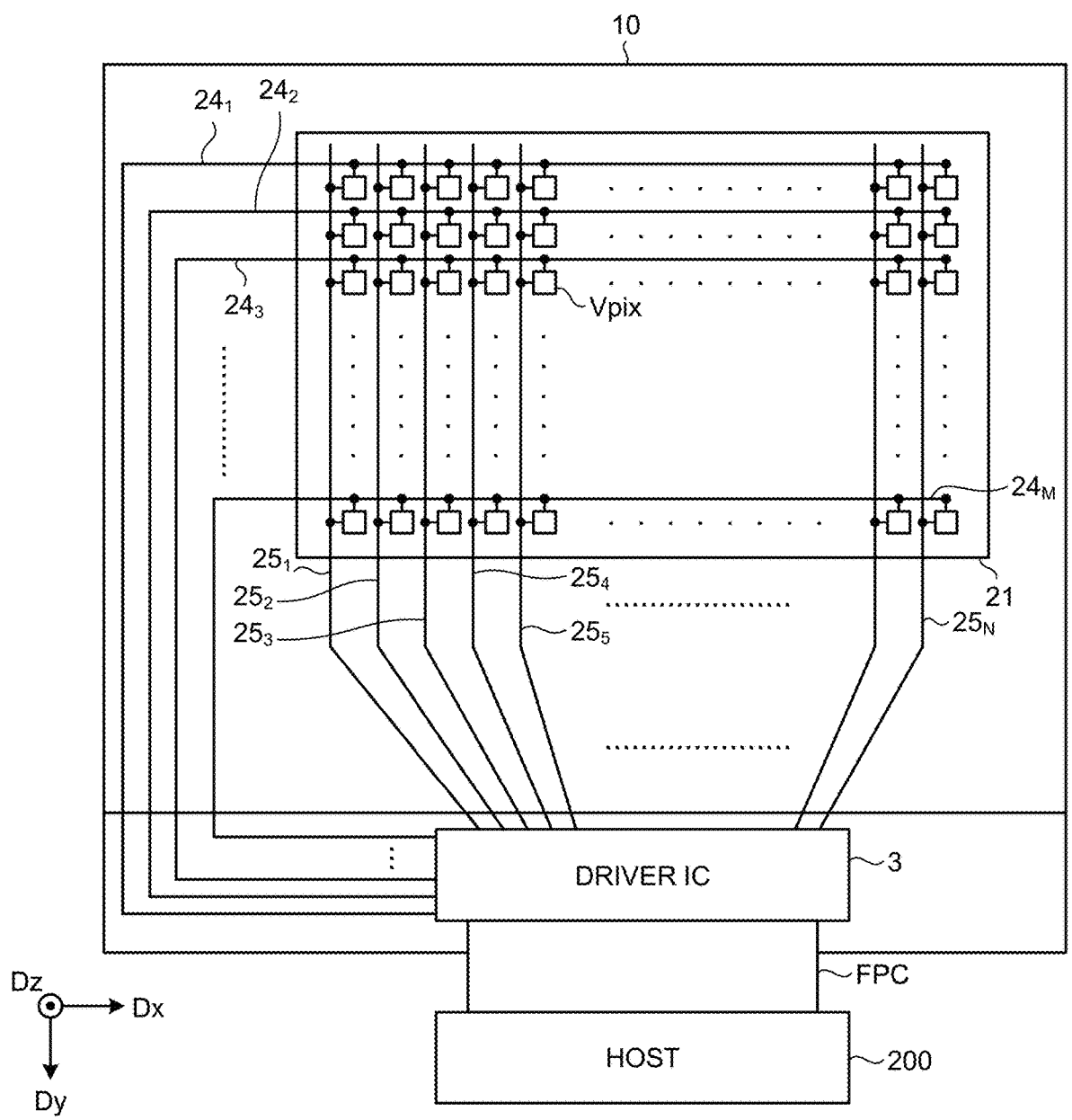
FIG. 4 is a block diagram illustrating an exemplary configuration of a liquid crystal panel.
Figure 5:
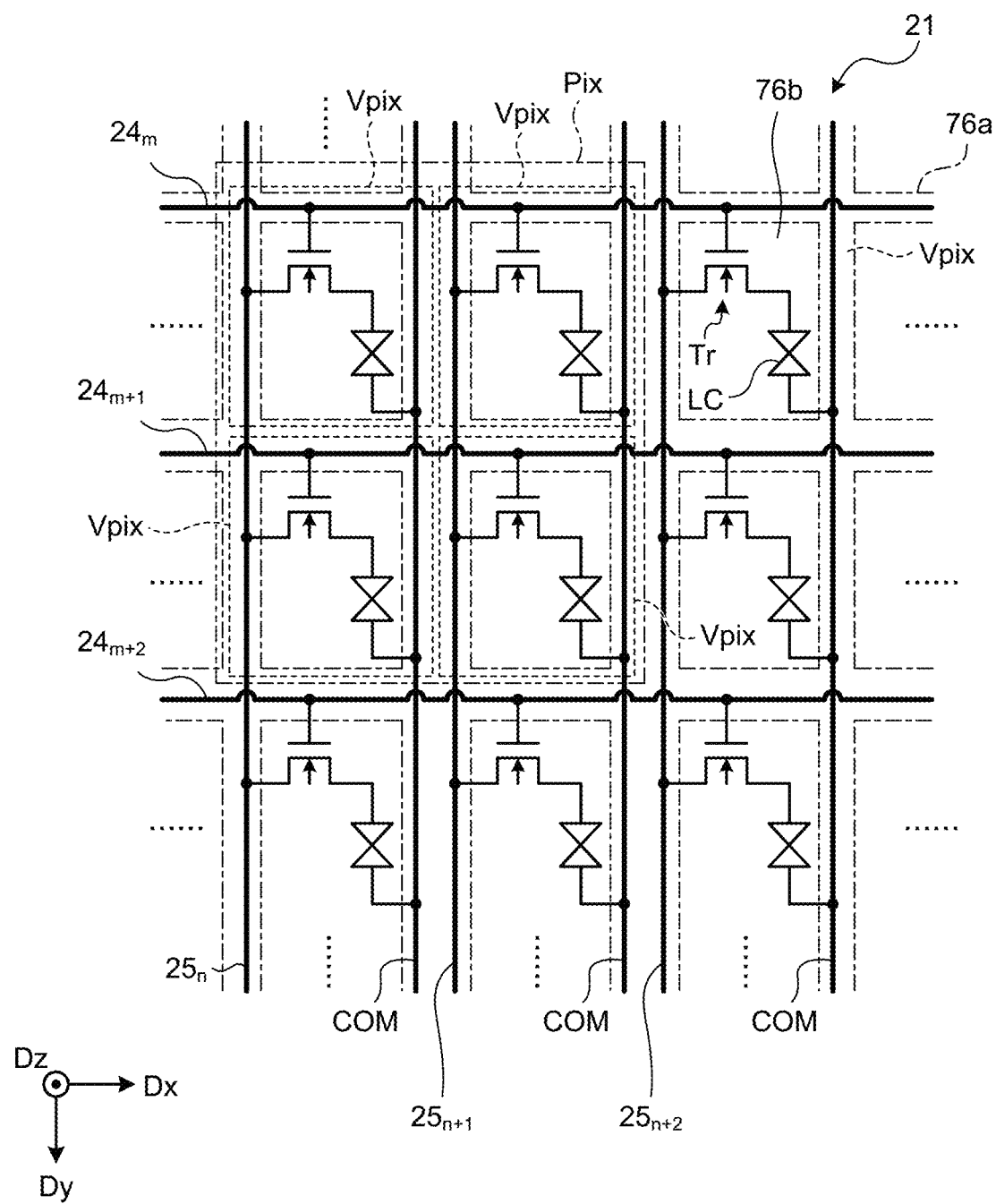
FIG. 5 is a circuit diagram illustrating an exemplary configuration of a drive circuit that drives pixels of the liquid crystal panel.

FIG. 4 is a block diagram illustrating an exemplary configuration of the liquid crystal panel 10. FIG. 5 is a circuit diagram illustrating an exemplary configuration of a drive circuit that drives the pixels Pix of the liquid crystal panel 10. The liquid crystal panel 10 is a display panel equipped with a driver IC 3. The driver IC 3 is a display driver integrated circuit (DDIC), for example.

More specifically, the liquid crystal panel 10 is a transmissive liquid crystal panel that outputs an image by projecting the image using light from the light source 20, for example. The liquid crystal panel is an insulating substrate having a light-transmitting property such as a glass substrate, for example. The liquid crystal panel has a display region 21, which is on the glass substrate. The display region 21 has a large number of pixels Pix including liquid crystal cells arranged in a matrix with a row-column configuration. The pixel Pix includes a plurality of sub-pixels Vpix (refer to FIG. 5). The liquid crystal panel is composed of a first substrate and a second substrate. A large number of pixel circuits including active elements (e.g., transistors) are formed on the first substrate in an arrangement of a matrix with a row-column configuration. The gap between the first substrate and the second substrate is maintained at a predetermined distance by photo spacers arranged and formed at various locations on the first substrate. A liquid crystal including crystal elements LC is enclosed between the first and the second substrates to form a liquid crystal layer 106 (refer to FIG. 6). The arrangement of the parts and the size of each part illustrated in FIG. 4 are schematic and do not reflect the actual arrangement and the like.

The display region 21 has a matrix structure with a row-column configuration in which the sub-pixels Vpix including the liquid crystal layer 106 are arranged in M rows by N columns. In this specification, the row is referred to as a pixel row that has N sub-pixels Vpix aligned in one direction. The column is referred to as a pixel column that has M sub-pixels Vpix aligned in a direction orthogonal to the direction in which the rows extend. The values of M and N are determined depending on the resolution in the direction Dy, which is a second direction, and the resolution in the direction Dx, which is a first direction. In the display region 21, scan lines $24_1$, $24_2$, $24_3$, . . . , and $24_M$ are provided row by row along the first direction Dx while signal lines $25_1$, $25_2$, $25_3$, . . . , and $25_N$ are provided column by column along the second direction Dy, in the M row-N column array of the sub-pixels Vpix. Hereinafter, in the present embodiment, the scan lines $24_1$, $24_2$, $24_3$, . . . , and $24_M$ may be collectively denoted as the scan lines 24, and the signal lines $25_1$, $25_2$, $25_3$, . . . , and $25_N$ may be collectively denoted as the signal lines 25. In the present embodiment, any three of the scan lines $24_1$, $24_2$, $24_3$, . . . , and $24_M$ are denoted as scan lines $24_m$, $24_{m+1}$, and $24_{m+2}$ (where m is a natural number satisfying m≤M−2), and any three of the signal lines $25_1$, $25_2$, $25_3$, . . . , and $25_N$ are denoted as signal lines $25_n$, $25_{n+1}$ and $25_{n+2}$ (where n is a natural number satisfying n≤N−2).

The first direction Dx and the second direction Dy are directions along the plate surface of the liquid crystal panel 10 and are orthogonal to each other. The third direction Dz is a direction orthogonal to the first direction Dx and the second direction Dy.

The driver IC 3 is a circuit mounted on the glass substrate of the liquid crystal panel by a chip on glass (COG) method, for example. The driver IC 3 is coupled to a host 200 via a structure that functions as wiring such as a flexible printed circuits (FPC). The host 200 is an external information processing device that outputs, to the driver IC 3, pixel signals for images to be projected by the HUD 100. The pixel signal is a combination of gradation values of red (R), green (G), and blue (B), for example. The number and kinds of colors corresponding to the gradation values included in the pixel signal are arbitrary. The host 200 also outputs, to the driver IC 3, various signals that are necessary for control of image projection by the HUD 100. Examples of the various signals include a master clock, a horizontal synchronous signal, a vertical synchronous signal, and the pixel signal, for example.

The driver IC 3 operates the liquid crystal panel 10 in response to various signals applied from the host 200. The driver IC3 functions as a gate driver and a source driver based on the signals supplied from the host 200. One or both of the gate driver and the source driver may be formed on the glass substrate using thin film transistors (TFTs). In such a case, one or both of the gate driver and the source driver may be electrically coupled to the driver IC 3. The source driver and the gate driver may be electrically coupled to different driver ICs 3 or the same driver IC 3.

The gate driver latches digital data in units of a horizontal period corresponding to the horizontal synchronous signal in synchronization with the vertical and the horizontal synchronous signals. The gate driver sequentially outputs the latched digital data for one line as vertical scan pulses and supplies the digital data to the scan lines 24 (the scan lines $24_1$, $24_2$, $24_3$, . . . , and $24_M$) in the display region 21 to select the sub-pixels Vpix sequentially row by row. The gate driver outputs the digital data sequentially to the scan lines $24_1$, $24_2$, . . . from one end side to the other end of the display region 21 in the row direction, for example. The gate driver can also output the digital data sequentially to the scan lines $24_M$, . . . from the other end side to the one end side of the display region 21 in the row direction.

The source driver receives pixel drive data generated based on the pixel signal, for example. The source driver writes the pixel drive data to the sub-pixels Vpix in the row selected by the vertical scan performed by the gate driver via the signal lines 25 (the signal lines $25_1$, $25_2$, $25_3$, . . . , and $25_N$), in units of a sub-pixel, in units of a plurality of sub-pixels, or in one unit of all the sub-pixels simultaneously.

Examples of known drive methods for liquid crystal panels include line inversion, dot inversion, and frame inversion. The line inversion is a drive method that reverses the polarity of the video signal in a time period of 1H (H is a horizontal period), which corresponds to one line (one pixel row). The dot inversion is a drive method that alternately reverses the polarity of the video signal for each of sub-pixels adjacent to each other for two intersecting directions (e.g., row and column directions). The frame inversion is a drive method that reverses the video signals to be written to all sub-pixels Vpix at once with the same polarity for each frame corresponding to one screen. The liquid crystal panel 10 can employ any of the above drive methods.

In the description of the present embodiment, each of M scan lines $24_1$, $24_2$, $24_3$, . . . , and $24_M$ may be referred to as the scan line 24 when the M scan lines are collectively handled. The scan lines $24_m$, $24_{m+1}$, and $24_{m+2}$ in FIG. 5 are part of the M scan lines $24_1$, $24_2$, $24_3$, . . . , and $24_M$. Each of the N signal lines $25_1$, $25_2$, $25_3$, . . . , and $25_N$ may be referred to as the signal line 25 when the N signal lines are collectively handled. The signal lines $25_n$, $25_{n+1}$, and $25_{n+2}$ in FIG. 5 are part of the N signal lines $25_1$, $25_2$, $25_3$, . . . , and $25_N$.

The wiring lines are formed in the display region 21. Examples of the wiring lines include the signal lines 25 that supply the pixel signals to TFT elements Tr in the sub-pixels Vpix and the scan lines 24 that drive the TFT elements Tr. The signal lines 25 extend in a plane parallel to the surface of the glass substrate described above and supply the pixel drive data generated based on the pixel signals for outputting images to the sub-pixels Vpix. The sub-pixels Vpix each include the TFT element Tr and the liquid crystal element LC. The TFT element Tr is formed with a thin-film transistor and is formed with an re-channel metal oxide semiconductor (MOS)-type TFT in this example. One of a source and a drain of the TFT element Tr is coupled to the signal line 25, a gate of the TFT element Tr is coupled to the scan line 24, and the other of the source and the drain is coupled to one end of the liquid crystal element LC. The one end of the liquid crystal element LC is coupled to the other of the source and the drain of the TFT element Tr while the other end of the liquid crystal element LC is coupled to a common potential line COM. A drive signal is applied to the common potential line COM by a drive electrode driver, which is not illustrated. The drive electrode driver may be included in the driver IC 3 or an independent circuit.

The sub-pixels Vpix belonging to the same row in the display region 21 are coupled to one another by the scan line 24. The scan lines 24 are coupled to the gate driver and receive the vertical scan pulses of scan signals supplied from the gate driver. The sub-pixels Vpix belonging to the same column in the display region 21 are coupled to one another by the signal line 25. The signal lines 25 are coupled to the source driver and receive the pixel signals supplied from the source driver. Furthermore, the sub-pixels Vpix belonging to the same column in the display region 21 are coupled to one another by the common potential line COM. The common potential lines COM are coupled to the drive electrode driver, which is not illustrated, and receive the drive signals supplied from the drive electrode driver.

The gate driver applies the vertical scan pulses to the gates of the TFT elements Tr of the sub-pixels Vpix via the scan lines 24 to sequentially select, as an image output target, one row (one horizontal line) of the sub-pixels Vpix formed in a matrix with a row-column configuration in the display region 21. The source driver supplies, via the signal lines 25, the pixel signals to the sub-pixels Vpix in the selected one of the horizontal lines, which are selected sequentially by the gate driver. As a result, image output for one horizontal line is performed by the sub pixels VPix in accordance with the supplied pixel signals.

As described above, the gate driver sequentially scans the scan lines 24, whereby the horizontal lines of the liquid crystal panel 10 are sequentially selected one by one. In the liquid crystal panel 10, the source driver supplies the pixel signals to the sub-pixels Vpix belonging to the selected one horizontal line via the signal lines 25, and the image output is performed for each horizontal line. When performing this image output operation, the drive electrode driver applies the drive signals to the common potential lines COM under the image output operation.

The display region 21 has a color filter. The color filter has a lattice-shaped black matrix 76a and apertures 76b. The black matrix 76a is formed to cover the peripheries of the sub-pixels Vpix as illustrated in FIG. 5. In other words, the black matrix 76a placed at the boundaries of the two-dimensionally arranged sub-pixels Vpix has a lattice shape. The black matrix 76a is formed of a material having a high light absorptance. The apertures 76b are openings formed in the lattice shape corresponding to the shape of the black matrix 76a and are arranged corresponding to sub-pixels Vpix.

The aperture 76b includes color regions corresponding to three-color (e.g., red (R), green (G), blue (B)) or four-color sub-pixels Vpix. Specifically, the aperture 76b includes color regions colored in red (R), green (G), and blue (B), which are examples of first, second, and third colors, respectively. In the color filter, color regions colored in red (R), green (G), and blue (B) are periodically arranged in the apertures 76b, for example. In the present embodiment, three color (R, G, and B) regions and a fourth color (e.g., W) are associated with the sub-pixel Vpix illustrated in FIG. 5. The set of four-color sub-pixels Vpix is associated with one pixel Pix. The pixel signal for one pixel Pix in the present embodiment corresponds to the output of one pixel Pix having red (R), green (G), and blue (B) sub-pixels Vpix. In the explanation of the present embodiment, red (R), green (G), and blue (B) are sometimes simply described as R, G, and B. When the number of colors of the sub-pixels Vpix included in the pixel Pix is equal to or smaller than two, or equal to or larger than five, the digital data corresponding to the number of colors may be supplied based on the original image data.

The color filter may be a combination of other colors as long as they are colored differently. In general, in the color filter, the luminance of the green (G) color region is higher than that of the red (R) and blue (B) color regions.

In the display region 21, the scan lines 24 and the signal lines 25 are disposed in the region overlapping with the black matrix 76a of the color filter when viewed from a direction orthogonal to the front surface of the display region 21. In other words, the scan lines 24 and the signal lines 25 are hidden behind the black matrix 76a when viewed from the direction orthogonal to the front surface. In the display region 21, the region where the black matrix 76a is not disposed is occupied with the apertures 76b.

Figure 6:
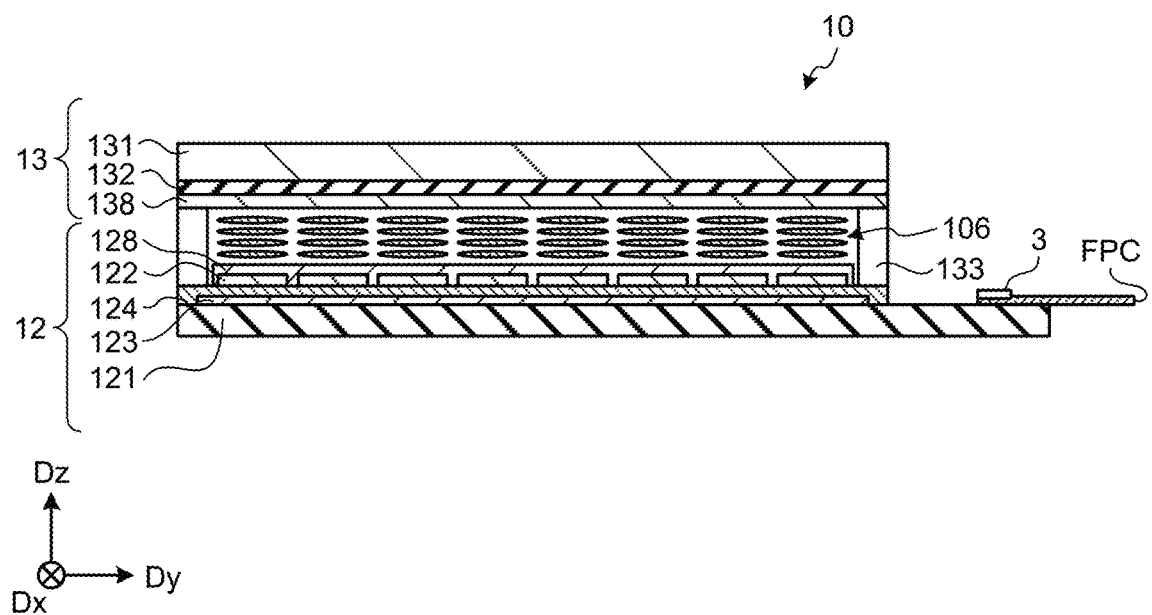
FIG. 6 is a diagram illustrating an exemplary multilayered structure of the liquid crystal panel.

FIG. 6 is a diagram illustrating an exemplary multilayered structure of the liquid crystal panel 10. The liquid crystal panel 10 includes an array substrate 12, a counter substrate 13, and a liquid crystal layer 106 serving as a display function layer. The counter substrate 13 is disposed so as to face the array substrate 12 in the direction perpendicular to the surface of the array substrate 12. The liquid crystal layer 106 is provided between the array substrate 12 and the counter substrate 13.

The array substrate 12 includes a first substrate 121, pixel electrodes 122, common electrodes 123, an insulating layer 124, and an orientation film 128. Various circuits, the TFT elements Tr, and various wiring lines (not illustrated in FIG. 6) such as the gate lines 24 and the signal lines 25 are provided on the first substrate 121.

The common electrodes 123 are provided on the upper side of the first substrate 121. The pixel electrodes 122 are provided on the upper side of the common electrodes 123 with the insulating layer 124 interposed therebetween. The pixel electrodes 122 are provided in a layer different from that of the common electrodes 123 and are arranged so as to overlap with the common electrodes 123 in a plan view. The pixel electrodes 122 are arranged in a matrix with a row-column configuration in a plan view. The orientation film 128 is provided on the upper side of the pixel electrodes 122. The pixel electrodes 122 and the common electrodes 123 are made of a conductive material having a light-transmitting property, such as indium tin oxide (ITO). The present embodiment describes the example in which the pixel electrodes 122 are provided on the upper side of the common electrodes 123. The common electrodes 123 may be provided on the upper side of the pixel electrodes 122.

In the explanation of the liquid crystal panel 10, the side in the direction from the first substrate 121 toward a second substrate 131 in the direction perpendicular to the surface of the first substrate 121 is referred to as an "upper side". The side in the direction from the second substrate 131 toward the first substrate 121 is referred to as a "lower side". The term "plan view" indicates the view in a direction perpendicular to the surface of the first substrate 121. The light source 20 is provided on the lower side of the array substrate 12.

The counter substrate 13 has the second substrate 131, a color filter 132, and an orientation film 138. The color filter 132 is formed on one surface of the second substrate 131. The orientation film 138 is provided on the lower side of the color filter 132.

The first substrate 121 and the second substrate 131 are arranged so as to face each other with a predetermined gap therebetween by a seal member 133. The liquid crystal layer 106 is provided in the space enclosed by the first substrate 121, the second substrate 131, and the seal member 133. The liquid crystal layer 106 modulates light that passes therethrough in accordance with an electric field state, and liquid crystal in a transverse electric field mode such as in-plane switching (IPS) including fringe field switching (FFS) is used therefor, for example. In the present embodiment, liquid crystal molecules included in the liquid crystal layer 106 are driven by transverse electric fields generated between the pixel electrodes 122 and the common electrodes 123. The liquid crystal element LC described above includes the pixel electrode 122, the common electrode 123, and liquid crystal molecules between the pixel electrode 122 and the common electrode 123. The pixel electrode 122 is coupled to the other of the source and the drain of the TFT element Tr. The common electrode 123 is coupled to the common potential line COM.

The liquid crystal panel 10 illustrated in FIG. 6 is a transverse electric field type liquid crystal display device, but it is not limited to this type and may be a longitudinal electric field type liquid crystal display device. In this case, the common electrodes 123 are provided to the counter substrate 13. In the longitudinal electric field type liquid crystal display device, the liquid crystal molecules included in the liquid crystal layer 106 are driven by what is called a longitudinal electric field generated between the pixel electrodes 122 and the common electrodes 123. Examples of liquid crystal for the longitudinal electric field type liquid crystal layer 106 include twisted nematic (TN) liquid crystal and vertical alignment (VA) liquid crystal.

The second polarization plate 52 is an optical member that transmits the s-wave and blocks light having a polarization direction other than the polarization direction of the s-wave. In other words, when the surface on the diffusion plate 40 side of the second polarization plate 52 is regarded as the interface, the second polarization plate 52 transmits light having a polarization direction perpendicular to the incident plane of the interface and blocks light having a polarization direction that is not perpendicular to the incident plane. The surface on the diffusion plate 40 side of the second polarization plate 52 is along the plane (Dx-Dy plane) orthogonal to the Dz direction, in the same manner as the surface on the diffusion plate 40 side of the first polarization plate 51. Hereinafter, in a case where simply referring to the s-wave, it refers to light that is perpendicular to the incident plane when the plane (Dx-Dy plane) orthogonal to the Dz direction is regarded as the interface. The light that is emitted from the light source and reaches the position CP15 is thus the s-wave. The polarization direction of the s-wave is along the Dx direction. In FIG. 3 and other figures, the second polarization plate 52 is marked with the circle-cross symbol for the purpose of indicating that the second polarization plate 52 transmits the s-wave. As described above, the second polarization plate 52 is a linear polarization plate having a transmission axis in the Dx direction.

In other words, the light that can be transmitted through the second polarization plate 52 is limited to the s-wave. Of the light that enters from the first polarization plate 51 side, is transmitted through the liquid crystal panel 10 described with reference to FIGS. 4 to 6, and reaches the position CP14, light that can reach the position CP15 is limited to the s-wave by the second polarization plate 52. The liquid crystal panel 10 controls the polarization direction of light transmitted through a plurality of pixels Pix individually by controlling the orientation of the liquid crystal molecules in each pixel. The liquid crystal panel 10 in the embodiment controls the orientation direction of the liquid crystal such that the polarization direction of light is changed by 90 degrees (°) when the degree of light being transmitted through the first polarization plate 51 and the second polarization plate 52 is set to be the highest, and controls the orientation direction of the liquid crystal such that the polarization direction of light is not changed when the degree of light being transmitted through the first polarization plate 51 and the second polarization plate 52 is set to be the lowest. As a result of such control, when the liquid crystal panel 10 is viewed from the second polarization plate 52 side in a direction toward the front surface of the plane (Dx-Dy plane) orthogonal to the Dz direction, the intensities of the s-waves transmitted through the second polarization plate 52 at the respective positions of the pixels Pix correspond to the pixel signals (gradation values) of pixels included in the image that is input to the liquid crystal panel 10 and output by the liquid crystal panel 10, i.e., the image projected as the virtual image VG.

The retardation plate 60 is an optical member that changes the polarization direction of incident light and transmits the light to output it. Specifically, the s-wave that passes through the second polarization plate 52 becomes the p-wave by being transmitted through the retardation plate 60. The light TL emitted from the position CP16 is thus the p-wave. As a result, light reflected by the reflection member ML and projected onto the windshield FG, that is, light of the image viewed by the user H as the virtual image VG becomes also the p-wave. This allows the user H to visually recognize the virtual image VG even when wearing the polarized sunglasses GL. This is because, as described above, the polarization direction of light absorbed by the optical member LE of the polarized sunglasses GL is along the Dx direction, i.e., the polarization direction of the s-wave. Light of the image projected by light having the p-wave is not absorbed by the optical member LE of the polarized sunglasses GL and reaches the eyes of the user H.

Furthermore, the polarization plate disposed on the light source 20 side of the liquid crystal panel 10 is the first polarization plate 51. This structure allows light emitted from the light source 20 to be transmitted more efficiently. The following describes a relation between the polarization direction of light and the degree of light transmission with reference to FIG. 7.

Figure 7:
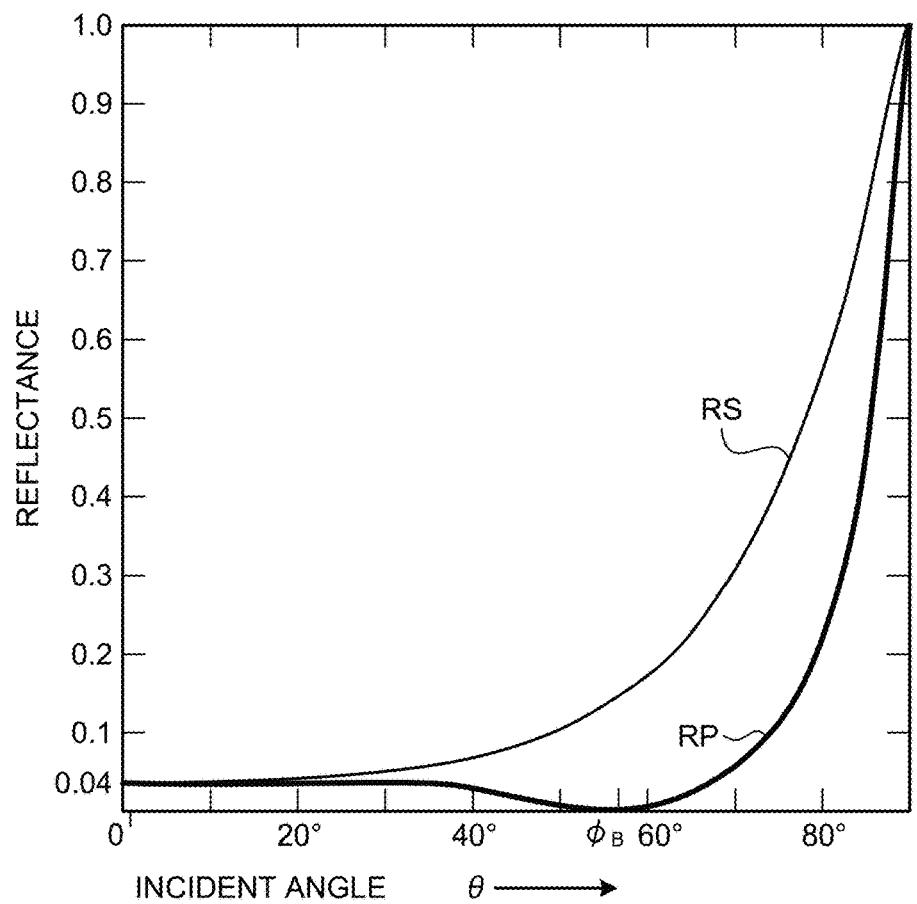
FIG. 7 is a graph illustrating exemplary relations between an incident angle of light with respect to an interface and a reflectance of a p-wave at the interface, and between the incident angle of light with respect to the interface and the reflectance of an s-wave at the interface.

FIG. 7 is a graph illustrating exemplary relations between the incident angle of light with respect to the interface and a reflectance of the p-wave at the interface, and between the incident angle of light with respect to the interface and the reflectance of the s-wave at the interface. A graph RP in FIG. 7 illustrates the reflectance of the p-wave. A graph RS in FIG. 7 illustrates the reflectance of the s-wave.

As illustrated in FIG. 7, the reflectance of the p-wave illustrated by the graph RP is equal to or lower than the reflectance of the s-wave illustrated by the graph RS, regardless of the incident angle. In particular, as illustrated by the graph RP, the reflectance of the p-wave is zero when the incident angle is an angle of $\varphi_B$. When the incident angle is not exactly the angle of $\varphi_B$, but closer to the angle of $\varphi_B$, the reflectance of the p-wave is significantly lower than that of the s-wave. In other words, the reflectance of the p-wave at the position CP12, that is, at the interface of the first polarization plate 51, becomes significantly lower than the reflectance of the s-wave at the interface as the polar angle $\theta$ is closer to the angle of $\varphi_B$. This indicates that the closer the polar angle $\theta$ is to the angle of $\varphi_B$, the smaller the reflection degree of the p-wave being reflected by the interface of the first polarization plate 51 is, whereby the p-wave is more efficiently transmitted through the first polarization plate 51.

The angle of $\varphi_B$ is the Brewster's angle. The Brewster's angle is the incident angle at which the reflectance of the p-wave is zero at the interface of materials having different refractive indices. The angle of $\varphi_B$ is obtained as in the following equation (4) where $n_1$ is the refractive index of the component (e.g., air) of the space surrounding the image output panel 1, and $n_2$ is the refractive index of the image output panel 1. Arctan in equation (4) indicates the inverse function of tangent (tan).

$$\varphi_B = \mathrm{Arctan}(n_2/n_1) \quad (4)$$

The closer the polar angle $\theta$ is to $\varphi_B$, naturally, the smaller the degree of light reflected by the diffusion plate 40 can be at the position CP11, i.e., at the interface of the diffusion plate 40 located on the light source 20 side of the first polarization plate 51. The p-wave is, thus, more efficiently transmitted through the image output panel 1. As described above, the reflectance of the p-wave at the positions CP11 and CP12 can be more reduced, thereby making it possible to increase the intensity of light reaching the positions CP13, CP14, CP15, and CP16.

The specific structure in consideration of the reflectance of the p-wave, which is described with reference to FIG. 7, is not limited to the layered structure of the image output panel 1, which is described with reference to FIG. 3. The following describes an exemplary structure different from that in FIG. 3 with reference to FIG. 8.

FIG. 8 is a schematic diagram illustrating an exemplary structure of an image output panel 1A that can be provided instead of the image output panel 1 illustrated in FIG. 3 in the embodiment. The image output panel 1A includes the diffusion plate 40, a retardation plate 60A, the second polarization plate 52, the liquid crystal panel 10, and the first polarization plate 51. The diffusion plate 40, the retardation plate 60A, the second polarization plate 52, the liquid crystal panel 10, and the first polarization plate 51 are arranged in this order from the light source 20 side to the reflection member ML (refer to FIG. 1) side. The diffusion plate 40, the retardation plate 60A, the second polarization plate 52, the liquid crystal panel 10, and the first polarization plate 51 are stacked in the Dz direction. The diffusion plate 40, the retardation plate 60A, the second polarization plate 52, the liquid crystal panel 10, and the first polarization plate 51 each have a plate like shape or film like shape along the plane (Dx-Dy plane) orthogonal to the Dz direction.

FIG. 8 illustrates the light that is emitted from the light source 20 and travels toward the image output panel 1 as light DLa. Of the light DLa, light that is transmitted through the image output panel 1A and travels toward the reflection member ML (refer to FIG. 1) is illustrated as light TLa. A position CP21 is a position where the light DLa starts to enter the diffusion plate 40. A position CP22 is a position between the diffusion plate 40 and the retardation plate 60A. A position CP23 is a position between the retardation plate 60A and the second polarization plate 52. A position CP24 is a position between the second polarization plate 52 and the liquid crystal panel 10. A position CP25 is a position between the liquid crystal panel 10 and the first polarization plate 51. A position CP26 is a position where the light TLa starts to be emitted from the first polarization plate 51.

The diffusion plate 40 illustrated in FIG. 8 is the same as the diffusion plate 40 described with reference to FIG. 3. The retardation plate 60A transmits light by changing the phase of the light so that the p-wave in the light transmitted through the diffusion plate 40 is transmitted as the s-wave. The retardation plate 60A allows the p-wave reaching the position CP22 with a lower reflectance achieved at the position CP21 by the diffusion plate 40 to be transmitted as the s-wave to the position CP23. The light that is emitted from the light source 20 and reaches the position CP23 is unpolarized light that is not limited to the s-wave. The p-wave reaches the position CP22 with a lower reflectance from a viewpoint in which the surface on the light source 20 side of the image output panel 1A functions as the interface, and the retardation plate 60A allows the p-wave reaching the position CP22 to reach the position CP23 as the s-wave.

The retardation plate 60 described with reference to FIG. 3 and the retardation plate 60A described with reference to FIG. 8 are optical members that function in the same way as the retardation plate that delays the phase of light so as to change the polarization direction of the light by 90 degrees (°).

The second polarization plate 52 is an optical member that transmits the s-wave and blocks light having a polarization direction other than the polarization direction of the s-wave, as described above. Thus, the second polarization plate 52 transmits the s-wave in the light reaching the position CP23. In other words, the light transmitted through the second polarization plate 52 is light caused to have a lower reflectance from a viewpoint in which the surface on the light source 20 side of the image output panel 1A functions as the interface. The light DLa emitted from the light source 20 becomes the s-wave when reaching the position CP24.

The first polarization plate 51 is an optical member that transmits the p-wave and blocks light having a polarization direction other than the polarization direction of the p-wave, as described above. In other words, the light that can be transmitted through the first polarization plate 51 is limited to the p-wave. Of the light that enters from the second polarization plate 52 side, is transmitted through the liquid crystal panel 10 described with reference to FIGS. 4 to 6, and reaches the position CP25, light that can reach the position CP26 is limited to the p-wave by the first polarization plate 51. The liquid crystal panel 10 between the second polarization plate 52 and the first polarization plate 51 illustrated in FIG. 8 controls the polarization direction of light transmitted through a plurality of pixels Pix individually by controlling the orientation of the liquid crystal molecules in each pixel. As a result of such control, when the liquid crystal panel 10 is viewed from the first polarization plate 51 side in a direction toward the front surface of the plane (Dx-Dy plane) orthogonal to the Dz direction, the intensities of the p-waves transmitted through the first polarization plate 51 at the respective positions of the pixels Pix correspond to the pixel signals (gradation values) of pixels included in the image that is input to the liquid crystal panel 10 and output by the liquid crystal panel 10, i.e., the image projected as the virtual image VG.

The light TLa output from the position CP26 is thus the p-wave. As a result, light reflected by the reflection member ML and projected onto the windshield FG, that is, light of the image viewed by the user H as the virtual image VG becomes also the p-wave. This allows the user H to visually recognize the virtual image VG even when wearing the polarized sunglasses GL. Furthermore, the light that becomes the p-wave is light transmitted with a lower reflectance at the position CP21 in the image output panel 1A. As described above, the image output panel 1A described with reference to FIG. 8 can transmit light emitted from the light source 20 more efficiently, in the same manner as the image output panel 1 described with reference to FIG. 3.

The following describes the fact that the embodiment (the image output panel 1 or the image output panel 1A) including a retardation plate (the retardation plate 60 or the retardation plate 60A) can project a brighter image in comparison with a reference example 1B that does not include a retardation plate.

FIG. 9 is a schematic diagram illustrating a structure of the reference example 1B. In the structure of the reference example 1B, the diffusion plate 40, the second polarization plate 52, the liquid crystal panel 10, and the first polarization plate 51 are stacked in the Dz direction in this order from the light source 20 side to the reflection member ML (refer to FIG. 1) side instead of the structure of the image output panel 1 described with reference to FIG. 3.

FIG. 9 illustrates the light that is emitted from the light source 20 and travels toward the diffusion plate 40 as light DLb. Of the light DLb, light that is transmitted through the structure of the reference example 1B and travels toward the reflection member ML (refer to FIG. 1) is illustrated as light TLb. A position CP31 is a position where the light DLb starts to enter the diffusion plate 40. A position CP32 is a position between the diffusion plate and the second polarization plate 52. A position CP33 is a position between the second polarization plate 52 and the liquid crystal panel 10. A position CP34 is a position between the liquid crystal panel 10 and the first polarization plate 51. A position CP25 is a position where the light TLb starts to be emitted from the first polarization plate 51.

In the reference example 1B, light that is emitted from the light source 20 and reaches the positions CP31 and CP32 is unpolarized light. Of the light that reaches the position CP32, light that is transmitted through the second polarization plate 52 and reaches the position CP33 is the s-wave. Of the s-wave, light that is transmitted through the liquid crystal panel 10 and the first polarization plate 51 and reaches the position CP35 is the p-wave.

In the reference example 1B illustrated in FIG. 9, light is limited to the s-wave by the second polarization plate 52 before reaching the liquid crystal panel 10. In other words, the p-wave is blocked. The reference example 1B projects images using the s-wave. The s-wave used in the reference example 1B has a lower intensity than that of the p-wave, and the intensity of the s-wave relative to the intensity of the p-wave is lower in the reference example 1B than in the image output panel 1 and the image output panel 1A because the surface on the light source 20 side of the diffusion plate 40 functions as the interface. If the locations of the first polarization plate 51 and the second polarization plate 52 are countercharged in the reference example 1B, light projected onto the windshield FG will be the s-wave, thereby making it impossible or very difficult for the user H wearing the polarized sunglasses GL to view images.

Figure 10:
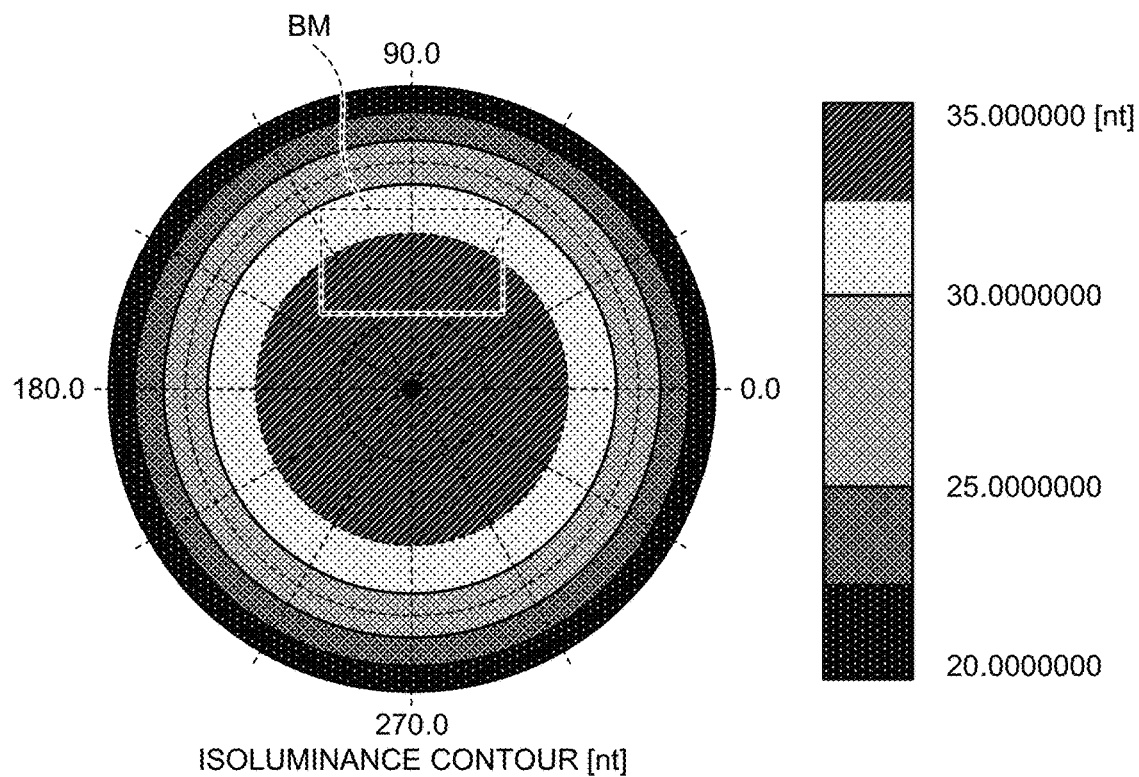
FIG. 10 is an isoluminous contour graph illustrating a brightness of an image projected onto a windshield by the reference example.
Figure 11:
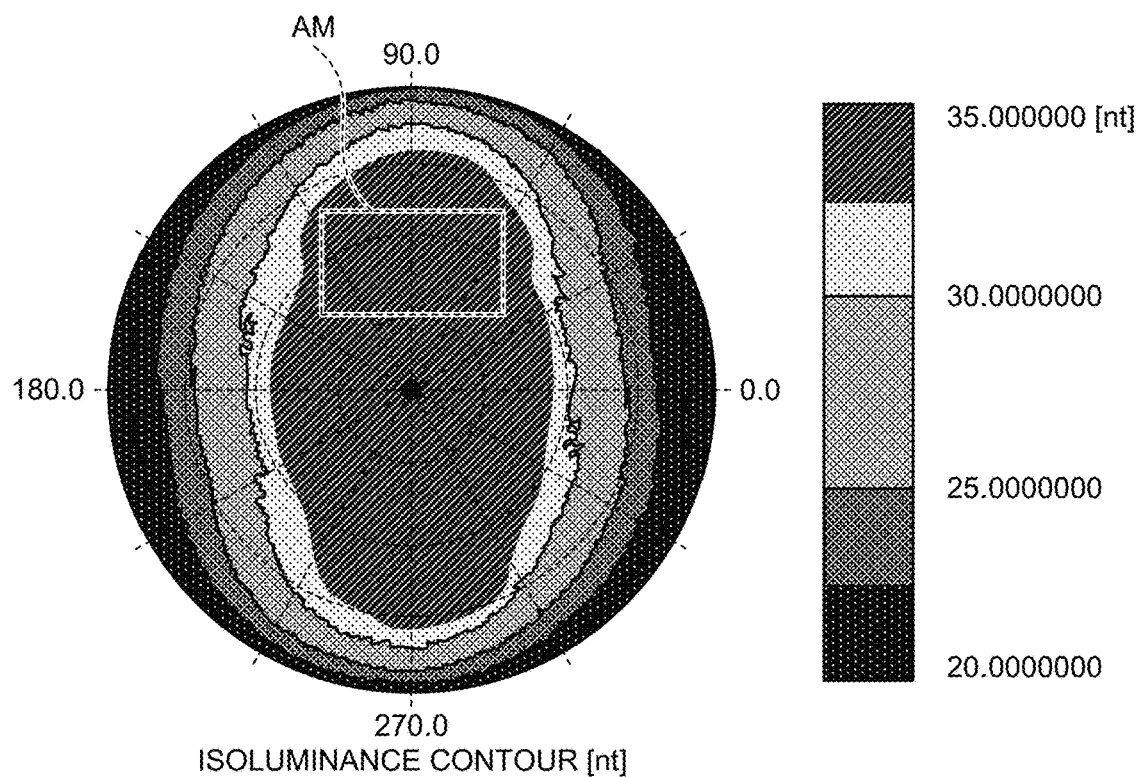
FIG. 11 is the isoluminous contour graph illustrating the brightness of the image projected onto the windshield by the embodiment.

FIG. 10 is an isoluminous contour graph illustrating the brightness of the image projected onto the windshield FG by the reference example 1B. FIG. 11 is the isoluminous contour graph illustrating the brightness of the image projected onto the windshield FG by the embodiment. A range BM illustrated in FIG. 10 indicates the brightness of the image projected by the reference example 1B. A range AM illustrated in FIG. 11 indicates the brightness of the image projected by the embodiment. The unit (nt) illustrated in FIGS. 10 and 11, and FIG. 12, which is described later, represents a candela per square meter ($cd/m^2$).

As comparatively illustrated in FIGS. 10 and 11, the range AM, in all of which the brightness is equal to or higher than 32.5 nt, is significantly brighter than the range BM, which includes a region in which the brightness is lower than 32.5 nt. In the reference example 1B, the brightness is uneven as in the range BM. In contrast, in the embodiment, the brightness is equal to or higher than 32.5 nt over the entire region, and the occurrence of unevenness is reduced.

Figure 12:
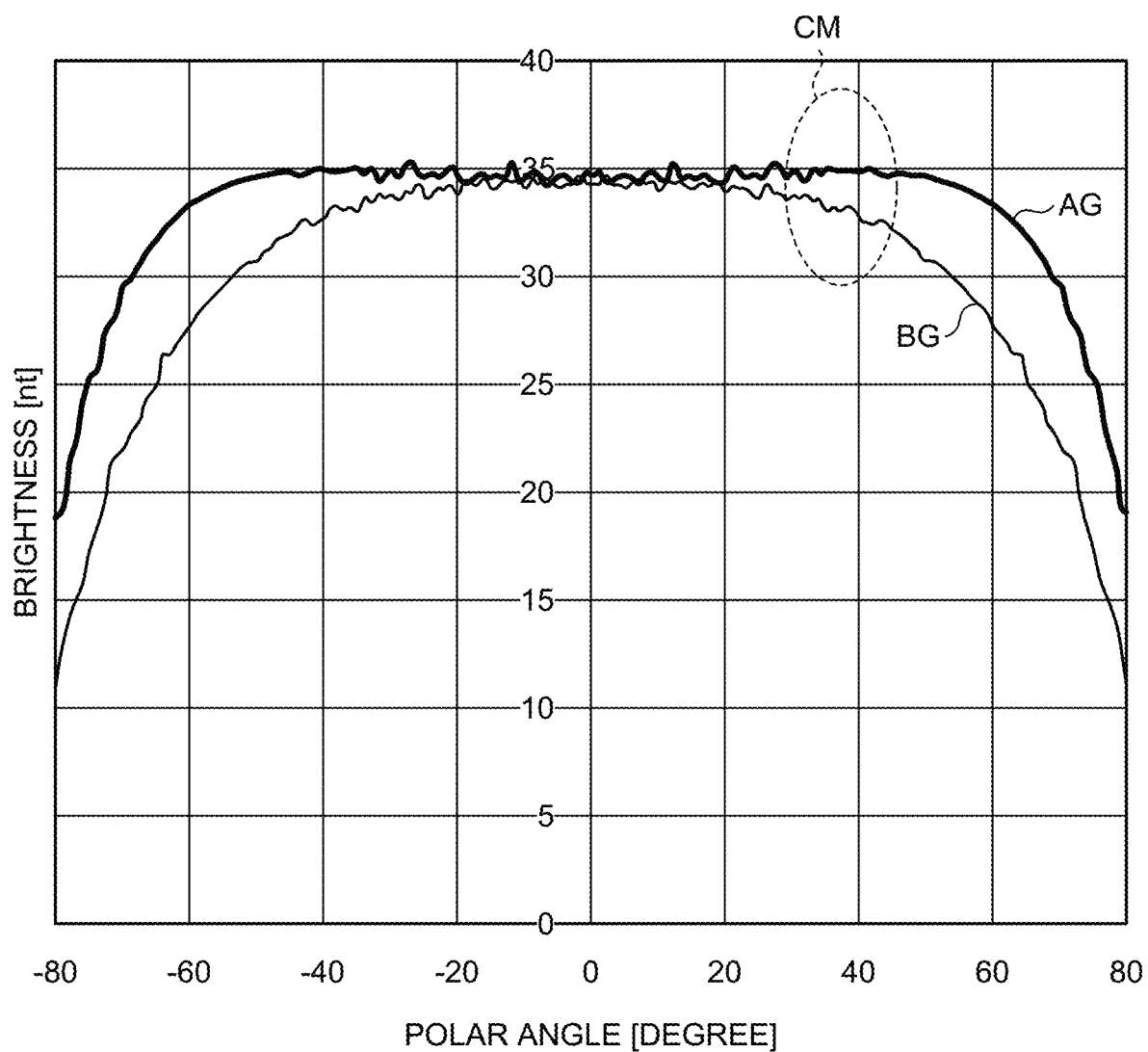
FIG. 12 is a graph illustrating a relation between a polar angle and the brightness of an image projected onto the windshield.

FIG. 12 is a graph illustrating a relation between the polar angle θ and the brightness of the image projected onto the windshield FG. A graph BG in FIG. 12 illustrates the brightness of the image projected onto the windshield FG by the reference example 1B. A graph AG in FIG. 12 illustrates the brightness of the image projected onto the windshield FG by the embodiment.

When the value of the polar angle θ is positive as in the polar angle range from 0 degrees (°) to 80 degrees (°) illustrated in FIG. 12, such an angle represents the polar angle θ that is made by the light source 20 and the diffusion plate 40 as illustrated in FIGS. 3, 8 and 9. In other words, the positive pole angle θ is the angle made by the image output panel 1 and the light source 20 in a positional relation where the distance between a first edge ED1 (refer to FIGS. 3, 8, and 9) of the image output panel 1 and the light emission surface 20a is smaller than the distance between a second edge ED2 (refer to FIGS. 3, 8, and 9) of the image output panel 1 and the light emission surface 20a. The first edge ED1 is an edge of the plate edges of the image output panel (e.g., the image output panel 1 or the image output panel 1A) through which the optical axis of light passes, wherein the light reaches a projection point (e.g., the projection point PP3) located relatively on the upper side among the light projection points serving as the source of the image (the virtual image VG) viewed by the user H. The second edge ED2 is an another edge of the plate edges of the image output panel (e.g., the image output panel 1 or the image output panel LA) through which the optical axis of light passes, wherein the light reaches a projection point (e.g., the projection point PP1) located relatively on the lower side among the light projection points serving as the source of the image (the virtual image VG) viewed by the user H. On the other hand, when the value of the polar angle θ is negative as in the polar angle range from 0 degrees (°) to −80 degrees (°) illustrated in FIG. 12, the polar angle θ having a negative value represents the angle made by the image output panel 1 and the light source 20 in a positional relation where the distance between the first edge ED1 of the image output panel 1 and the light emission surface 20a is larger than the distance between the second edge ED2 of the image output panel 1 and the light emission surface 20a.

In the reference example 1B, as especially illustrated in the graph in an attention region CM in the graph BG in FIG. 12, when the polar angle θ exceeds 30 degrees (°), the brightness of the projected image is significantly reduced to be lower than that when the polar angle θ is within a range equal to or larger than 0 degrees (°) and lower than 30 degrees (°). In contrast, in the embodiment, as long as the polar angle θ is within a range from 0 degrees (°) to 50 degrees (°), the brightness of the projected image hardly changes, and when the polar angle θ exceeds 30 degrees (°), the projected image is significantly brighter than that in the reference example 1B.

As described above, the image output panel 1 according to the embodiment includes: the first polarization plate 51 that transmits light polarized in a first direction and blocks light polarized in a direction different from the first direction; the second polarization plate 52 that transmits light polarized in a second direction different from the first direction and blocks light polarized in a direction different from the second direction; the liquid crystal panel 10 that is disposed between the first polarization plate 51 and the second polarization plate 52 and includes a plurality of pixels Pix in which a degree of change in a polarization direction of light entering from one side and travelling toward the other side is individually controllable; and the retardation plate (the retardation plate 60 or the retardation plate 60A) that faces the liquid crystal panel 10 with the first polarization plate 51 or the second polarization plate 52 interposed therebetween and changes the polarization direction of light from the first direction to the second direction or from the second direction to the first direction. When a polarization direction of output light that is output from the image output panel 1 is referred to as a first polarization direction, the output light having the first polarization direction is light having the first polarization direction included in incident light from the light source 20. This allows the polarization direction of light entering the image output panel 1 and the polarization direction of light that is transmitted through the image output panel 1 and is output from the image output panel 1 to be identical.

The light source 20 may be provided on the one side with respect to the image output panel 1, and the image output panel 1 may be inclined with respect to the light emission surface 20a of the light source 20. The image output panel 1 is inclined with respect to the light emission surface 20a so that light (e.g., the p-wave) that is not the s-wave enters the image output panel 1 when one surface facing the light emission surface 20a of the image output panel 1 is regarded as the interface. This allows an image that is visible by a user wearing the polarized sunglasses GL to be output. In addition, the image output panel 1 provided so as to allow the p-wave to enter the image output panel 1 makes it possible to output a brighter image.

As described with reference to FIG. 3, the first polarization plate 51 may be provided on the light emission surface 20a side with respect to the liquid crystal panel and transmit the p-wave when the plate surface on the light emission surface 20a side of the image output panel 1 is regarded as the interface, and the retardation plate 60 may be provided on the opposite side opposite to the light emission surface 20a side with respect to the liquid crystal panel 10. This allows both projection of a brighter image and viewing of the image by a user wearing the polarized sunglasses GL.

As described with reference to FIG. 8, the first polarization plate 51 may be provided on the opposite side opposite to the light emission surface 20a side with respect to the liquid crystal panel 10 and transmit the p-wave when the plate surface on the light emission surface 20a side of the image output panel 1 is regarded as the interface, and the retardation plate 60A may be provided on the light emission surface 20a side with respect to the liquid crystal panel 10. This allows both projection of a brighter image and viewing of the image by a user wearing polarized sunglasses (e.g., the polarized sunglasses GL).

The angle (polar angle θ) between the light emission surface 20a and the image output panel (e.g., the image output panel 1 or the image output panel 1A) may be the Brewster's angle (e.g., the angle of $\varphi_B$) corresponding to the refractive index difference between the refractive index of the image output panel and the refractive index of air surrounding the image output panel, or may be an angle within an angle range where the reflectance of the p-wave when the plate surface on the light emission surface 20a side of the image output panel is regarded as the interface is lower than the reflectance of the s-wave when the plate surface is regarded as the interface. As a result, the image brightness can be more easily achieved.

Of the light that enters the liquid crystal panel 10 from the one side of the image output panel 1, light that is transmitted to the other side of the image output panel 1 may be projected onto a projection destination member having a light-transmitting property (e.g., the windshield FG). As a result, the image output panel 1 can be employed as a component of the HUD.

The HUD 100 of the embodiment is a head-up display that includes the light source 20 that emits light from the light emission surface 20a; and the image output panel (e.g., the image output panel 1 or the image output panel 1A) that is provided so as to be inclined with respect to the light emission surface 20a at an angle (the polar angle θ), and projects light that is emitted from the light emission surface 20a and transmitted through the image output panel onto the projection destination member having a light-transmitting property (e.g., the windshield FG). The image output panel includes: the first polarization plate 51 that transmits the p-wave when the plate surface on the light emission surface 20*a* side of the image output panel is regarded as the interface, and blocks light polarized in a direction different from that of the p-wave; the second polarization plate 52 that transmits the s-wave when the plate surface is regarded as the interface, and blocks light polarized in a direction different from that of the s-wave; the liquid crystal panel 10 that is disposed between the first polarization plate 51 and the second polarization plate 52 and includes a plurality of pixels Pix in which a degree of change in the polarization direction of light entering from the light emission surface 20*a* and travelling toward the opposite side opposite to the light emission surface 20*a* side is individually controllable; and the retardation plate (e.g., the retardation plate 60 or the retardation plate 60A) that changes the polarization direction of light entering from the light emission surface 20*a* side and travelling toward the opposite side opposite to the light emission surface 20*a* side from the polarization direction of the p-wave to the polarization direction of the s-wave or from the polarization direction of the s-wave to the polarization direction of the p-wave. Each of the light entering the liquid crystal panel 10 from the light emission surface 20*a* side and the light transmitted through the image output panel 1 is light transmitted through the plate surface as the p-wave. This allows the p-wave having a lower reflectance at the interface to be used for image projection. As a result, brighter images can be projected. Furthermore, when the light transmitted through the image output panel 1 is the p-wave, the image is allowed to be viewed through the structure that transmits the p-wave without absorbing it. The embodiment, thus, allows both projection of a brighter image and viewing of the image by a user wearing polarized sunglasses (e.g., the polarized sunglasses GL).

The polarization direction of the s-wave when the plate surface on the light emission surface 20*a* side of the image output panel (e.g., the image output panel 1 or the image output panel 1A) is regarded as the interface, may correspond to the direction of arrangement (e.g., the Dx direction) of two eyes of a user (e.g., the user H) viewing an image projected onto the projection destination member (e.g., the windshield FG). This allows both projection of a brighter image and viewing of the image by a user wearing polarized sunglasses (e.g., the polarized sunglasses GL).

The HUD 100 described with reference to FIG. 1 includes the single reflection member ML. The number of structures that are provided on the optical path of light for projecting an image and reflect light, such as the reflection member ML, is not limited to one. The number of the structures may be two or more, or such a structure may not be provided.

The diffusion plate 40 can be omitted. The projection destination member is not limited to the windshield FG provided in four-wheeled vehicles, but may be any member having a light-transmitting property.

Other action effects provided by the modes described in the above-mentioned embodiment that are obvious from description of the present specification or at which those skilled in the art can appropriately arrive should naturally be interpreted to be provided by the present disclosure.

What is claimed is:

1. An image output panel comprising:
    a first polarization plate that transmits light polarized in a first direction and blocks light polarized in a direction different from the first direction;
    a second polarization plate that transmits light polarized in a second direction different from the first direction and blocks light polarized in a direction different from the second direction;
    a liquid crystal panel that is disposed between the first polarization plate and the second polarization plate and includes a plurality of pixels in which a degree of change in a polarization direction of light entering from one side and travelling toward the other side is individually controllable; and
    a retardation plate that faces the liquid crystal panel with the first polarization plate or the second polarization plate that is interposed between the retardation plate and the liquid crystal panel, and changes the polarization direction of light from the first direction to the second direction or from the second direction to the first direction, wherein
    when a polarization direction of output light that is output from the image output panel is referred to as a first polarization direction, the output light having the first polarization direction is light having the first polarization direction included in incident light from a light source.

2. The image output panel according to claim 1, wherein the light source is provided on the one side with respect to the image output panel, and
    the image output panel is inclined with respect to a light emission surface of the light source.

3. The image output panel according to claim 2, wherein the first polarization plate is provided on the one side with respect to the liquid crystal panel and transmits a p-wave when a plate surface on the light emission surface side of the image output panel is regarded as an interface, and
    the retardation plate is provided on the other side with respect to the liquid crystal panel.

4. The image output panel according to claim 2, wherein the first polarization plate is provided on the other side with respect to the liquid crystal panel and transmits a p-wave when a plate surface on the light emission surface side of the image output panel is regarded as an interface, and
    the retardation plate is provided on the one side with respect to the liquid crystal panel.

5. The image output panel according to claim 2, wherein an inclination angle with respect to the light emission surface is a Brewster's angle corresponding to a refractive index difference between a refractive index of the image output panel and a refractive index of air surrounding the image output panel or is an angle within an angle range where a reflectance of a p-wave when a plate surface on the light emission surface of the image output panel is regarded as an interface is lower than a reflectance of an s-wave when the plate surface is regarded as the interface.

6. The image output panel according to claim 1, wherein of the light that enters the liquid crystal panel from the one side of the image output panel, light that is transmitted to the other side is projected onto a projection destination member having a light-transmitting property.

7. A head-up display comprising:
    a light source that is configured to emit light from a light emission surface; and
    an image output panel that is provided so as to be inclined with respect to the light emission surface at an angle, wherein
    the head-up display is configured to project light that is emitted from the light emission surface and transmitted through the image output panel onto a projection destination member having a light-transmitting property, the image output panel includes:
- a first polarization plate that transmits a p-wave when a plate surface on the light emission surface side of the image output panel is regarded as an interface, and blocks light polarized in a direction different from that of the p-wave;
- a second polarization plate that transmits an s-wave when the plate surface is regarded as the interface, and blocks light polarized in a direction different from that of the s-wave;
- a liquid crystal panel that is disposed between the first polarization plate and the second polarization plate and includes a plurality of pixels in which a degree of change in a polarization direction of light entering from the light emission surface side and travelling toward the opposite side opposite to the light emission surface side is individually controllable; and
- a retardation plate that changes the polarization direction of light entering from the light emission surface side and travelling toward the opposite side from the polarization direction of the p-wave to the polarization direction of the s-wave or from the polarization direction of the s-wave to the polarization direction of the p-wave, and each of the light that enters the liquid crystal panel from the light emission surface side and the light that is transmitted through the image output panel is light transmitted through the plate surface as the p-wave.

8. The head-up display according to claim 7, wherein the polarization direction of the s-wave corresponds to a direction of arrangement of two eyes of a user viewing an image projected onto the projection destination member.

\* \* \* \* \*